United States Patent
Ju et al.

(10) Patent No.: US 9,207,024 B2
(45) Date of Patent: Dec. 8, 2015

(54) PATTERNED HEAT SINK LAYER FOR ELIMINATING LATERAL THERMAL BLOOM

(71) Applicant: SEAGATE TECHNOLOGY LLC, Cupertino, CA (US)

(72) Inventors: Ganping Ju, Pleasanton, CA (US); Xiaobin Zhu, San Ramon, CA (US); Chubing Peng, Eden Prairie, MN (US); Yukiko A. Kubota, Campbell, CA (US); Yingguo Peng, San Ramon, CA (US); Timothy J. Klemmer, Fremont, CA (US); Jan-Ulrich Thiele, Sunnyvale, CA (US); David S. Kuo, Palo Alto, CA (US); Bin Lu, San Ramon, CA (US); Julius K. Hohlfeld, Eden Prairie, MN (US)

(73) Assignee: Segate Technology LLC, Cupertino, CA (US)

( * ) Notice: Subject to any disclaimer, the term of this patent is extended or adjusted under 35 U.S.C. 154(b) by 112 days.

(21) Appl. No.: 14/055,768

(22) Filed: Oct. 16, 2013

(65) Prior Publication Data
US 2015/0013946 A1    Jan. 15, 2015

Related U.S. Application Data

(60) Provisional application No. 61/844,400, filed on Jul. 9, 2013.

(51) Int. Cl.
*F28F 3/08* (2006.01)

(52) U.S. Cl.
CPC .................................... *F28F 3/08* (2013.01)

(58) Field of Classification Search
None
See application file for complete search history.

(56) References Cited

U.S. PATENT DOCUMENTS

| | | | |
|---|---|---|---|
| 8,507,114 B2 | 8/2013 | Peng et al. | |
| 8,576,672 B1 * | 11/2013 | Peng et al. | 369/13.14 |
| 8,765,273 B1 * | 7/2014 | Kubota et al. | 428/831.2 |
| 2004/0240327 A1 * | 12/2004 | Sendur et al. | 369/13.35 |
| 2008/0026255 A1 * | 1/2008 | Das et al. | 428/831.2 |
| 2011/0043941 A1 * | 2/2011 | Champion et al. | 360/59 |
| 2014/0043947 A1 * | 2/2014 | Hohlfeld et al. | 369/13.4 |
| 2014/0269231 A1 * | 9/2014 | van de Veerdonk | 369/13.4 |

* cited by examiner

*Primary Examiner* — Paul Huber

(57) ABSTRACT

The embodiments disclose at least one predetermined patterned layer configured to eliminate a physical path of lateral thermal bloom in a recording device, at least one gradient layer coupled to the patterned layer and configured to use materials with predetermined thermal conductivity for controlling a rate of dissipation and a path coupled to the gradient layer and configured to create a path of least thermal conduction resistance for directing dissipation along the path, wherein the path substantially regulates and prevents lateral thermal bloom.

20 Claims, 7 Drawing Sheets

PATTERNED HEAT SINK LAYER FOR ELIMINATING LATERAL THERMAL BLOOM

CROSS-REFERENCE TO RELATED APPLICATIONS

This application claims the benefit of U.S. Provisional Patent Application Ser. No. 61/844,400 filed Jul. 9, 2013, entitled "A METHOD FOR FABRICATING PATTERNED HEAT ASSISTED MAGNETIC RECORDING STACKS WITH PARTIALLY PATTERNED HEAT SINK AND THERMAL RESISTOR LAYER", by Ju, et al.

DETAILED DESCRIPTION

Figure 1:
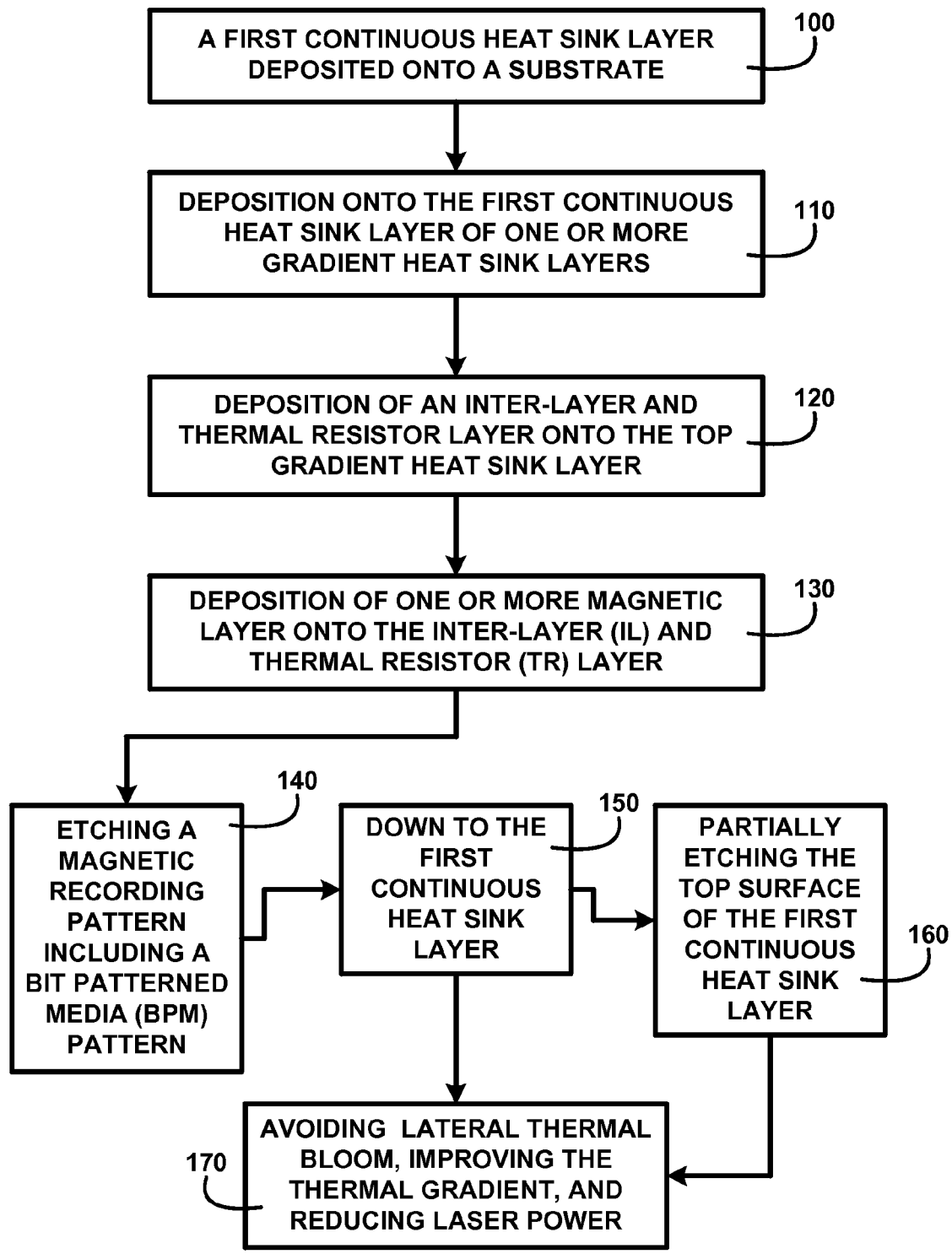
FIG. 1 shows a block diagram of an overview of a method for fabricating patterned gradient heat sinks of one embodiment.

In a following description, reference is made to the accompanying drawings, which form a part hereof, and in which is shown by way of illustration a specific example of one embodiment. It is to be understood that other embodiments may be utilized and structural changes may be made without departing from the scope.

General Overview

It should be noted that the descriptions that follow, for example, in terms of a method for fabricating patterned gradient heat sinks is described for illustrative purposes and the underlying system can apply to any number and multiple types of magnetic recording patterns. In one embodiment, a method for fabricating patterned gradient heat sinks can be configured using at least one depositions of materials with predetermined properties of thermal conductivity. In another embodiment, The method for fabricating patterned gradient heat sinks can be configured to include at least one gradient heat sink layers and can be configured to include at least one magnetic layers.

The transfer of heat (heat transfer) is normally from a high temperature object to a lower temperature object. The high temperature object is said to dissipate or lose heat through the heat transfer to the object of lower temperature. Conduction is heat transfer by means of molecular agitation within a material without any motion of the material as a whole. Various materials have differing conductive properties. The materials are given numbers that tell their relative rates of conduction. Materials are compared to silver (coefficient of heat conduction of 100). The coefficient of some other products are copper (92), iron (11), water (0.12), wood (0.03). A perfect vacuum has a conduction coefficient of zero. A conduction coefficient can be expressed as a value of thermal conductivity indicated by the symbol (k) and can be expressed in units of watts per meter (W m) using degrees Kelvin (° K.).

The rate of heat transfer depends upon the temperature gradient and the thermal conductivity of the material. For example the thermal conductivity is quite high for metals, where for thermal conductivity is less for most non-metallic solids. A heat sink is a large mass of material with high thermal conductivity. Heat from materials connected to a heat sink is transferred to the heat sink through conduction and is dissipated from the originating heat source material to the heat sink. The rate at which the heat is dissipated or transferred from one material to another depends upon the temperature gradient and the thermal conductivity of the materials in and between the initial heat source and the materials along the connective path to the heat sink. The variations of the thermal conductivity of the materials creates a gradient within which the heat transfers at different rates of heat transfer over time from one to the other.

Since the heat transfer follows a direction from a high temperature object to a lower temperature object the heat transfer can be directed along a path or series of connected materials. The variation in thermal conductivity along the path creates a gradient including a gradient of progressively higher thermal conductivity properties. The connected materials can be selected whereby the respective mass and variation in thermal conductivity properties will control the rate of the heat transfers and thereby the rate of dissipation of heat from the initial heated source through each successive material layer. The control of the rate of heat transfers and resulting dissipation is possible since conduction is the transfer of heat from one molecule to another through a substance. Not all substances conduct heat at the same speed. Metals and stone are considered good conductors since they can speedily transfer heat, but wood, paper, air, and cloth are poor heat conductors. For example the poorest heat conductors are used as insulators or insulation.

FIG. 1 shows a block diagram of an overview of a method for fabricating patterned gradient heat sinks of one embodiment. FIG. 1 shows a method for fabricating patterned heat assisted magnetic recording (HAMR) stacks with partially patterned heat sink and thermal resistor layer including a first continuous heat sink layer deposited onto a substrate 100. The fabrication continues with a deposition onto the first continuous heat sink layer of at least one gradient heat sink layers 110. Fabrication processes continue with a deposition of an inter-layer and thermal resistor layer onto the top gradient heat sink layer 120 and a deposition of at least one magnetic layer onto the inter-layer and thermal resistor layer 130 of one embodiment.

The fabrication includes etching a magnetic recording pattern including a bit patterned media (BPM) pattern 140 down to the first continuous heat sink layer 150 and alternately partially etching the top surface of the first continuous heat sink layer 160. The etching a magnetic recording pattern including a bit patterned media (BPM) pattern 140 includes the etching of the at least one gradient heat sink layers and inter-layer (IL) and thermal resistor (TR) layer and alternately the partial etching of the first continuous heat sink layer thus avoiding lateral thermal bloom, improving the thermal gradient, and reducing laser power 170 of one embodiment.

DETAILED DESCRIPTION

Figure 2:
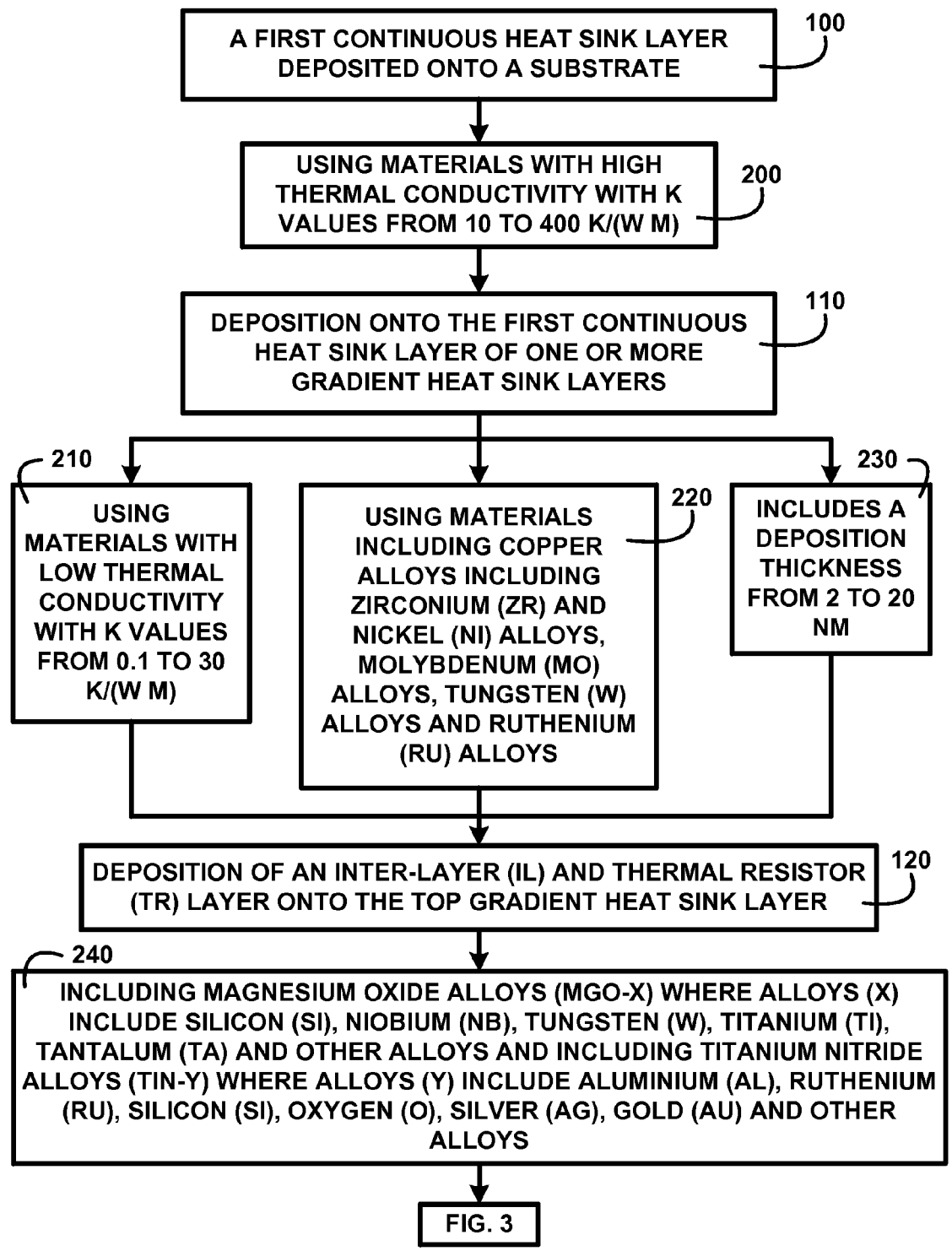
FIG. 2 shows a block diagram of an overview flow chart of a method for fabricating patterned gradient heat sinks of one embodiment.

FIG. 2 shows a block diagram of an overview flow chart of a method for fabricating patterned gradient heat sinks of one embodiment. Thermal conductivity is the measure of the speed of heat flow passed from particle to particle. The rate of heat flow through a specific material will be influenced by the difference of temperature and by its thermal conductivity. Thermal conductivity is a measure of the capacity of a material to conduct heat through its mass. It can be defined as the amount of heat/energy (expressed in kcal, Btu or J) that can be conducted in unit time through unit area of unit thickness of material, when there is a unit temperature difference. Thermal conductivity is also known as the k-value and can be expressed in the SI system in watt (W) m–1° C.–1 of one embodiment.

FIG. 2 shows the first continuous heat sink layer deposited onto a substrate 100. The deposition of the first continuous heat sink layer is made using materials with high thermal conductivity with k values from 10 to 400 k/(W m) 200. The deposition onto the first continuous heat sink layer of at least one gradient heat sink layers 110 is made using materials with low thermal conductivity with k values from 0.1 to 30 k/(W m) 210. This includes using materials including copper alloys including zirconium (Zr) and nickel (Ni) alloys, molybdenum (Mo) alloys, tungsten (W) alloys and ruthenium (Ru) alloys 220 and includes a deposition thickness from 2 to 20 nm 230. The deposition of an inter-layer and thermal resistor layer onto the top gradient heat sink layer 120 includes using materials including magnesium oxide alloys (MgO—X) where alloys (X) include silicon (Si), niobium (Nb), tungsten (W), titanium (Ti), tantalum (Ta) and other alloys and including Titanium nitride alloys (TiN—Y) where alloys (Y) include aluminum (Al), ruthenium (Ru), silicon (Si), oxygen (O), silver (Ag), gold (Au) and other alloys 240. The description of the fabrication processes continues in FIG. 3 of one embodiment.

Figure 3:
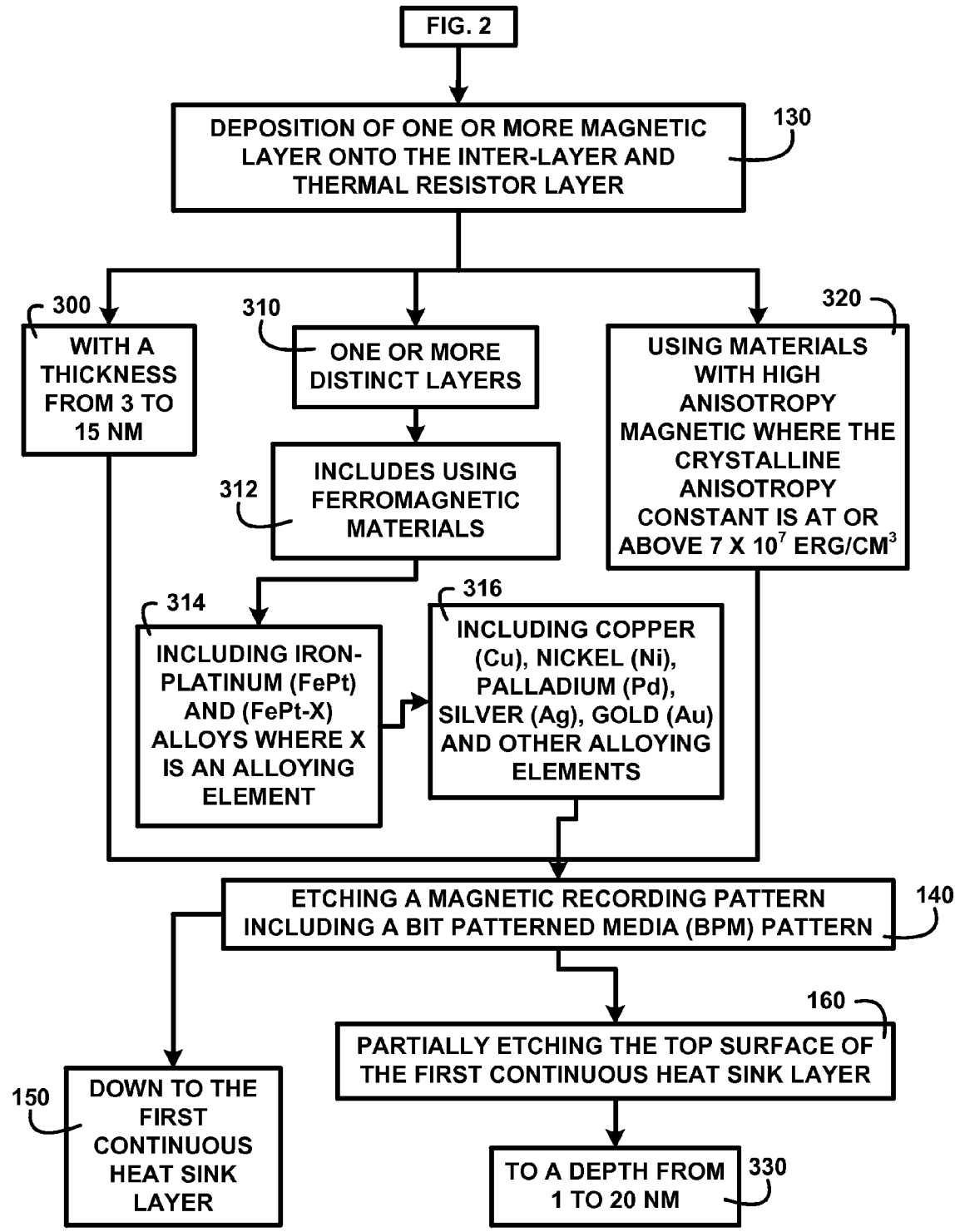
FIG. 3 shows a block diagram of an overview flow chart of etching a magnetic recording pattern of one embodiment.

FIG. 3 shows a block diagram of an overview flow chart of etching a magnetic recording pattern of one embodiment. FIG. 3 shows a continuation of the processes from FIG. 2 including deposition of at least one magnetic layer onto the inter-layer and thermal resistor layer 130. The at least one magnetic layer includes at least one distinct layers 310. The at least one distinct layers 310 includes using ferromagnetic materials 312 including iron-platinum (FePt) and (FePt—X) alloys where X is an alloying element 314. The (FePt—X) alloys includes using an alloying element including copper (Cu), nickel (Ni), palladium (Pd), silver (Ag), gold (Au) and other alloying elements 316 of one embodiment.

The dependence of magnetic properties on a preferred direction is called magnetic anisotropy. The magnetic anisotropy constant of a material decreases with increased temperatures above room temperature and vanishes at the Curie temperature. Both the magnetocrystalline and magnetostriction constants are dependent on temperature and particle sizes. The deposition of the ferromagnetic materials includes using magnetic materials with high anisotropy where the crystalline anisotropy constants are at or above $7\times10^7$ erg/cm$^3$ 320. High anisotropy enables thermal stability of the magnetization of the nanoscale grains in the magnetic materials of one embodiment.

The fabrication continues with etching a magnetic recording pattern including a bit patterned media (BPM) pattern 140. The etching of the magnetic recording pattern is made down to the first continuous heat sink layer 150. Alternately the etching of the magnetic recording pattern is made down to the first continuous heat sink layer 150 and partially etching the top surface of the first continuous heat sink layer 160 to a depth from 1 to 20 nm 330 of one embodiment.

Figure 4:
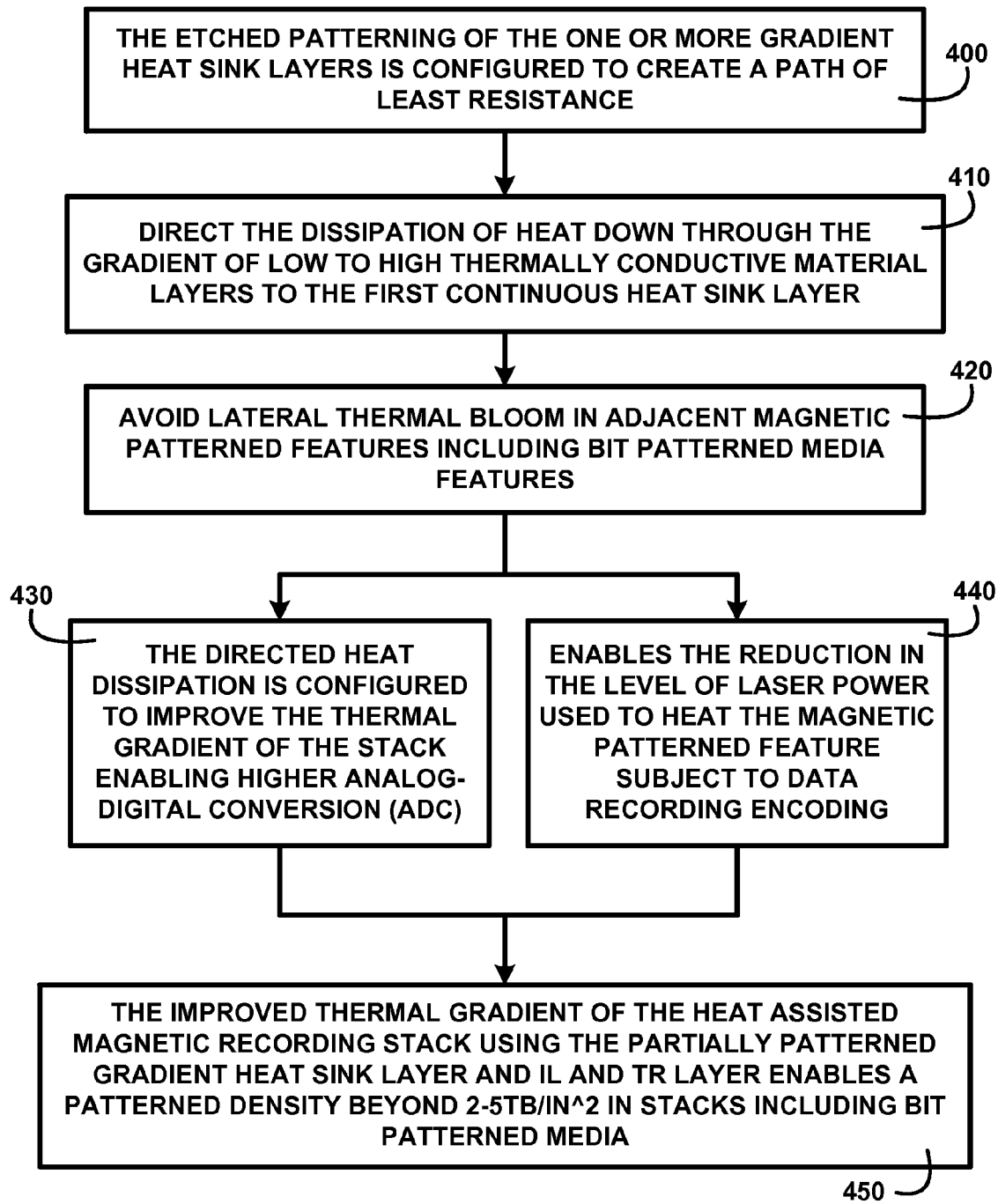
FIG. 4 shows a block diagram of an overview flow chart of directing the dissipation of heat of one embodiment.

FIG. 4 shows a block diagram of an overview flow chart of directing the dissipation of heat of one embodiment. FIG. 4 shows the etched patterning of the at least one gradient heat sink layers is configured to create a path of least resistance 400. The path of least resistance is used to direct the dissipation of heat down through the gradient of low to high thermally conductive material layers to the first continuous heat sink layer 410 to avoid lateral thermal bloom in adjacent magnetic patterned features including bit patterned media features 420 of one embodiment.

The directed heat dissipation is configured to expand the thermal gradient of the stack enabling higher analog-digital conversion 430 and enables the reduction in the level of laser power used to heat the magnetic patterned feature subject to data recording encoding 440. The applied read/write (r/w) head magnetic field polarity orientation encodes the recorded data when rapid cooling of the heated region occurs. An effective field gradient results from using an expanded thermal gradient using the patterned gradient heat sink layers of the HAMR stack patterned features including bit patterned media (BPM) pillars (islands). The expanded thermal gradient of the heat assisted magnetic recording stack using the partially patterned gradient heat sink layer and thermal resistor layer enables a patterned density beyond 2-5 tb/in^2 in stacks including bit patterned media 450 in part due to reduced island sizes enabled by higher anisotropy offered by FePt and other high anisotropy media of one embodiment.

Figure 5A:
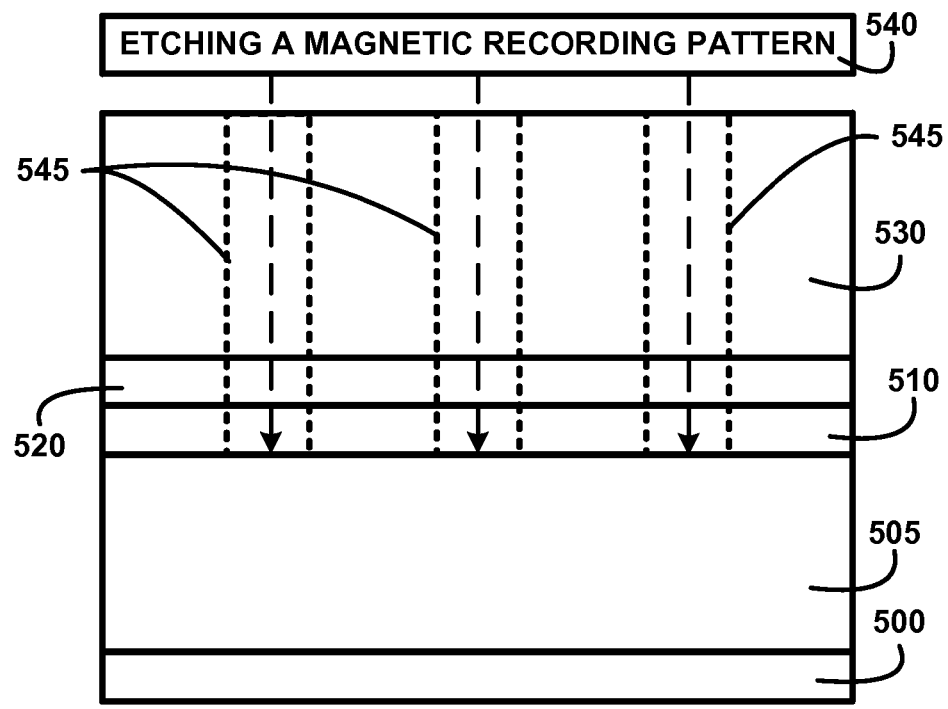
FIG. 5A shows for illustrative purposes only an example of a gradient heat sink layer of one embodiment.

FIG. 5A shows for illustrative purposes only an example of gradient heat sink layer of one embodiment. A method for fabricating patterned gradient heat sinks includes patterning at least one predetermined layer that is patterned to eliminate a physical path of lateral thermal bloom, using at least one predetermined including a patterned gradient heat sink layer using materials with low thermal conductivity to control a rate of dissipation thereby reducing laser heating power and time, and directing the dissipation along a path of least thermal conduction resistance to substantially regulate and prevent lateral thermal bloom. FIG. 5A shows the substrate 500 and a first continuous heat sink layer 505 with high thermal conductivity deposited thereon. A second gradient heat sink layer 510 with low thermal conductivity is deposited on top of the first continuous heat sink layer 505. The thin IL and TR layer 520 is deposited on the second gradient heat sink layer 510 and the magnetic layer 530 is deposited thereon. The depositions are followed by etching a magnetic recording pattern 540 including for example the BPM pattern 545 down to the first continuous heat sink layer 150 of FIG. 1 of one embodiment.

Figure 5B:
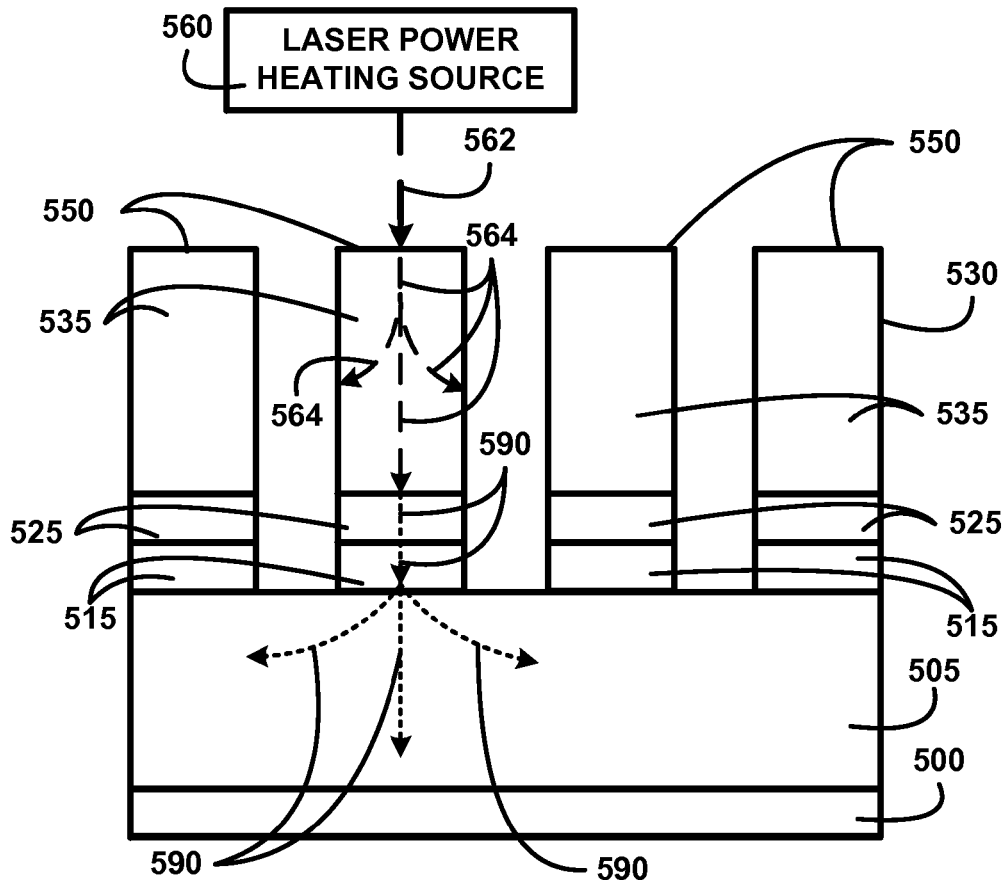
FIG. 5B shows for illustrative purposes only an example of a patterned gradient heat sink layer of one embodiment.

FIG. 5B shows for illustrative purposes only an example of patterned gradient heat sink layer of one embodiment. A patterned gradient heat sink structure including at least one predetermined patterned layer to eliminate a physical path of lateral thermal bloom, at least one predetermined patterned layer using materials with low thermal conductivity to control a rate of dissipation thereby reducing laser heating power and time, and wherein the dissipation is directed along a path of least thermal conduction resistance to substantially regulate and prevent lateral thermal bloom. FIG. 5B shows a patterned HAMR stack including the substrate 500 and the first continuous heat sink layer 505. FIG. 5B shows a plurality of patterned second gradient heat sink layer 515, patterned thin IL and TR layer 525 and patterned magnetic layer features 535 including for example a plurality of BPM feature pillar (dot) 550 features. The laser power heating source 560 applies heat to the magnetic materials of the targeted BPM feature pillar (dot) 550. Applied heat 562 from the laser power heating source 560 is distributed by conducted heat 564 throughout the magnetic material of the targeted BPM feature pillar (dot) 550 of one embodiment.

The thermal resistance of a patterned thin IL and TR layer 525 slows the dissipation of heat from the magnetic materials and enables the targeted BPM feature pillar (dot) 550 to reach a temperature above the Curie temperature (Tc). The patterned thin IL and TR layer 525 cannot laterally conduct the resisted thermal gain. The reduction in mass of the patterned thin IL and TR layer 525 enables the adjustment of the thickness of the patterned thin IL and TR layer 525. Adjusting of the thickness includes adding and thinning the thickness of the patterned thin IL and TR layer 525 to regulate the amount of power and time used to heat the magnetic materials of the targeted patterned features including BPM feature pillar (dot) 550 features. The heat losses of the magnetic materials are reduced since no heat is being dissipated laterally along the continuous thin IL and TR layer 520 of FIG. 5A as shown in FIG. 5B. This enables the magnetic materials of the targeted BPM feature pillar (dot) 550 to reach a temperature above Tc in less time where DT/Dt is greater than that using the continuous thin IL and TR layer 520 of FIG. 5A. This reduces the amount of energy used by the laser power heating source 560 to apply heat assistance to the magnetic recording process of the patterned HAMR stack of one embodiment.

The heat dissipation 590 from the patterned thin IL and TR layer 525 thermal resistant materials into a patterned second gradient heat sink layer 515 with thermal conductivity forms a path of least resistance which directs the heat flow downwards from the targeted BPM feature pillar (dot) 550. The heat gain in the patterned second gradient heat sink layer 515 is directed and rapidly flows from its low thermal conductivity material into the first continuous heat sink layer 505 high thermal conductivity material. The mechanics of thermal conductivity show the heat flow rate is greater from a material of low thermal conductivity to a material of high thermal conductivity than the reverse. The thermal conductivity mechanism of greater heat flow rates from low to high thermal conductivity is used to direct the flow away from the targeted BPM feature pillar (dot) 550 into the first continuous heat sink layer 505. The thermal conductivity mechanism of lesser heat flow rates from high to low thermal conductivity and the differing mass (heat gain capacity) of the first continuous heat sink layer 505 prevents the dissipated heat from flowing into adjacent non-targeted BPM feature pillar (dot) 550 features thus preventing lateral thermal bloom. The directed dissipation of the heat using the method for fabricating patterned gradient heat sinks prevents lateral thermal bloom thereby improving the thermal gradient across the plurality of patterned features including bit patterned media (BPM) features in patterned HAMR stacks of one embodiment.

Figure 6A:
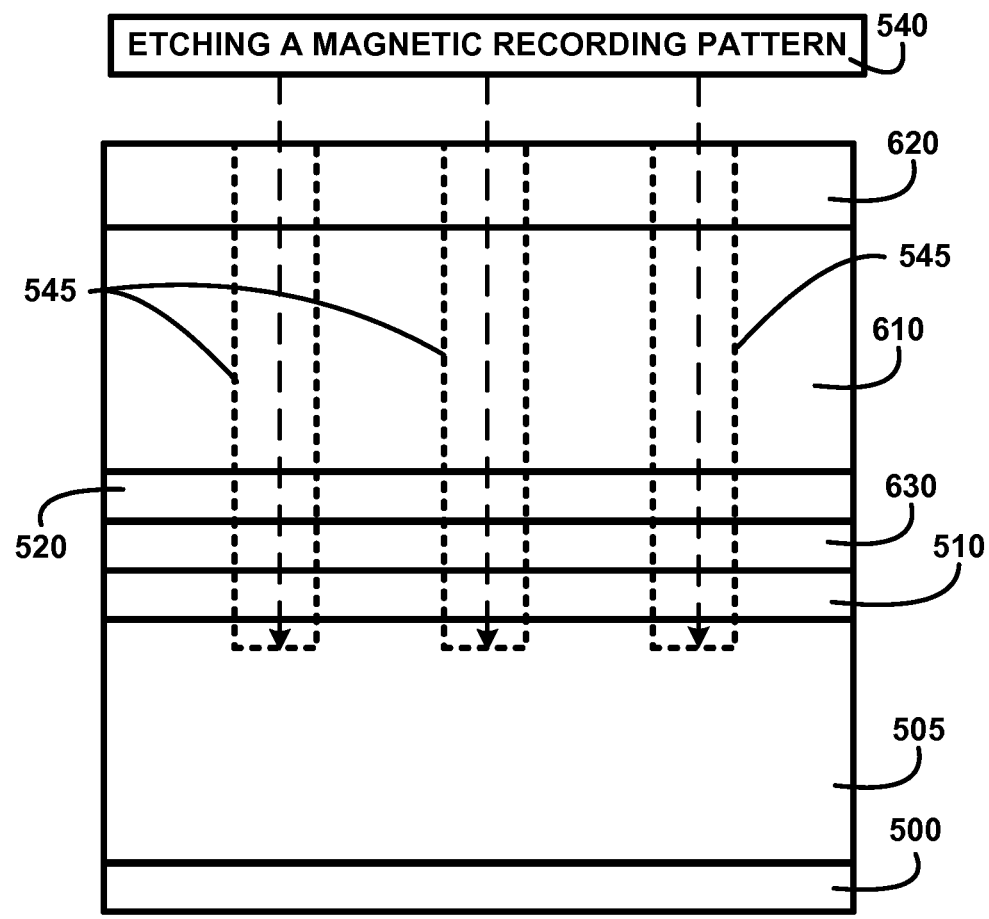
FIG. 6A shows for illustrative purposes only an example of multiple gradient heat sink layers of one embodiment.

FIG. 6A shows for illustrative purposes only an example of multiple gradient heat sink layers of one embodiment. FIG. 6A shows a structure of multiple gradient heat sink layers in a HAMR stack. The structure includes the substrate 500 with the first continuous heat sink layer 505 with high thermal conductivity deposited thereon. The second gradient heat sink layer 510 is shown deposited using materials with low thermal conductivity with k values for example 8 k/(W m) on to the first continuous heat sink layer 505. A deposition of a third gradient heat sink layer 630 using materials with low thermal conductivity with k values for example 3 k/(W m) is made on the second gradient heat sink layer 510. The thin IL and TR layer 520 is deposited upon the top of the third gradient heat sink layer 630. The structure includes multiple magnetic layers including a first magnetic layer 610 and second magnetic layer 620 wherein the first magnetic layer 610 is deposited on the thin IL and TR layer 520 and the second magnetic layer 620 deposited on the first magnetic layer 610. A process is used for etching a magnetic recording pattern 540 including a BPM pattern 545 down to and partially etching the top surface of the first continuous heat sink layer 160 of one embodiment.

Figure 6B:
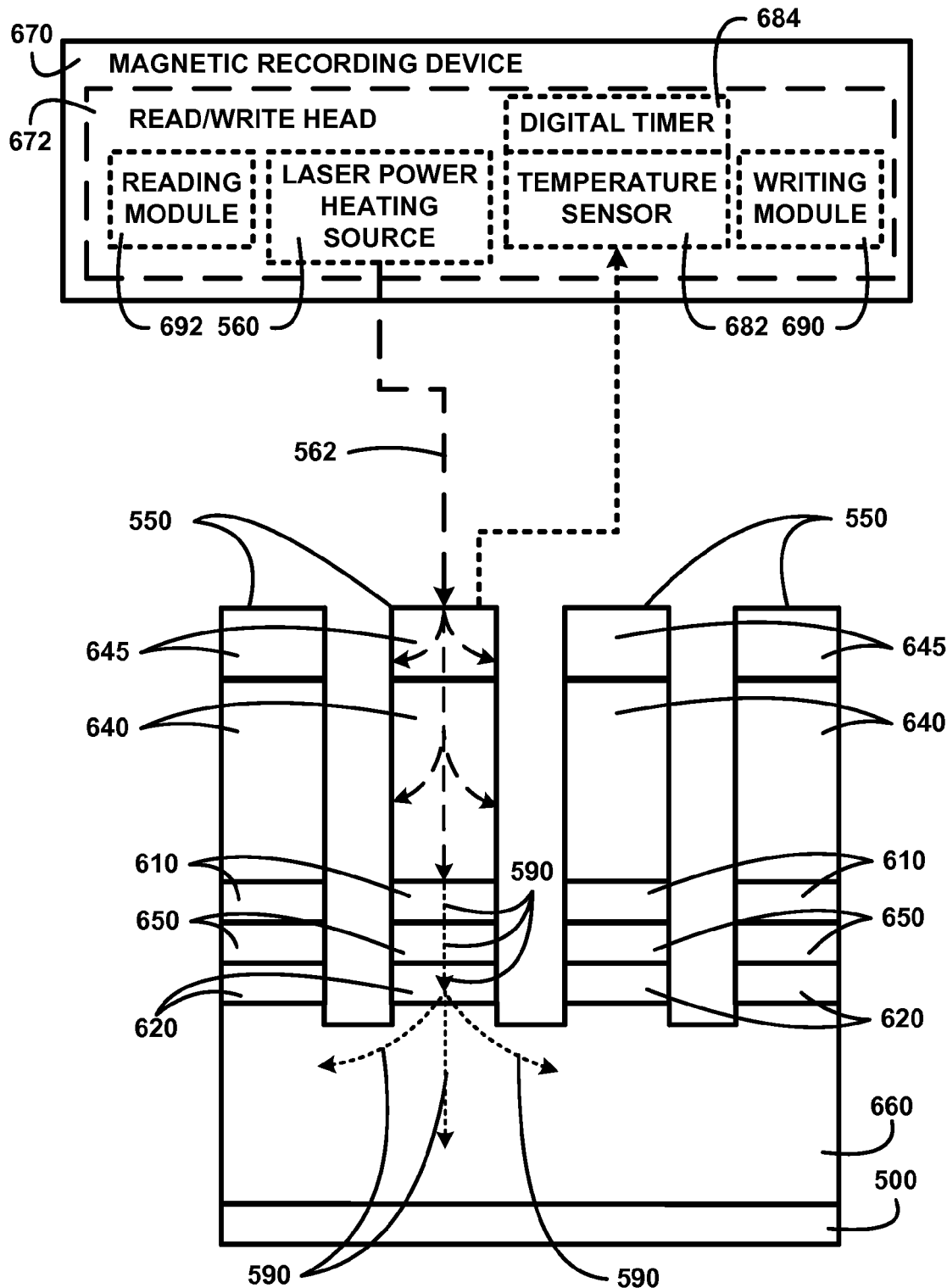
FIG. 6B shows for illustrative purposes only an example of a partially patterned continuous heat sink layer of one embodiment.

FIG. 6B shows for illustrative purposes only an example of partially patterned continuous heat sink layer of one embodiment. FIG. 6B shows the patterned HAMR stack with etched BPM patterned features including a plurality of BPM feature pillar (dot) 550 features. The patterned HAMR stack includes the substrate 500, partially patterned first continuous heat sink layer 660 with high thermal conductivity, patterned second gradient heat sink layer 515, patterned third gradient heat sink layer 650, patterned thin IL and TR layer 525, patterned first magnetic layer 640 and patterned second magnetic layer 645 of one embodiment.

The method for fabricating patterned gradient heat sinks uses a thermal conductivity apparatus including means for regulating a heat flow rate of heat assisted magnetic recording stack features, means for regulating a temperature of the heat assisted magnetic recording stack features during a heating function, and means for regulating a temperature of the heat assisted magnetic recording stack features during a heat dissipation cooling function. An apparatus including a magnetic recording device 670 read/write head 672 can include a laser power heating source 780, a temperature sensor 682, a digital timer 684, a writing module 690 and a reading module 692. The laser power heating source 530 can be used to apply heat to the magnetic materials in a targeted BPM feature pillar (dot) 550. The laser power heating source 560 applies heat to the targeted BPM feature pillar (dot) 550. Applied heat 562 from the laser power heating source 560 is distributed by conducted heat 564 throughout the magnetic material of the targeted BPM feature pillar (dot) 550. This enables the magnetic materials of the targeted BPM feature pillar (dot) 550 to reach a temperature above Tc of one embodiment.

The temperature sensor 682 can be used to determine the point in time when the targeted BPM feature pillar (dot) 550 reaches a temperature above Tc in the heating cycle and reaches a temperature below Tc in the cooling or heat dissipation cycle. The digital timer 684 can be used to determine the heat flow rate of the heat gain and dissipation of the magnetic materials in the targeted BPM feature pillar (dot) 550. A periodic determination of the heat flow rates can for example be stored and used as an adjustable predetermined cycle time. The adjustable predetermined cycle time can for example be used to make adjustments in the power levels and duration in the laser power heating source 560 depending on current ambient temperature and read/write speeds of a particular magnetic drive device. The temperature sensor 682 readings can be used to switch-off the power to the laser power heating source 560 and turn-on and off the power to the writing module 690 current during a recording function of one embodiment.

The heat is spread throughout the mass of both the patterned first magnetic layer 640 and patterned second magnetic layer 645. The thermal resistance of the patterned thin IL and TR layer 525 prevents the rapid dissipation of heat and thusly leads to a rapid rise in temperature of the magnetic layers without any lateral thermal conduction while the heat is being applied. This reduces the application time of heat from the laser power heating source 560 of one embodiment.

A magnetic field induced from the read/write head 672 current is passed through the targeted BPM feature pillar (dot) 550. The magnetic anisotropy constant of a material decreases with increased temperatures above room temperature and vanishes at the Curie Temperature (Tc). The applied read/write head 672 magnetic field polarity orientation encodes the recorded data when rapid cooling of the heated region occurs in the magnetic materials of the BPM feature pillar (dot) 550 of one embodiment.

The rapid cooling of the heated patterned second magnetic layer 645 and patterned first magnetic layer 640 begins when the laser power heating source 780 stops the application of heat. The heat dissipation 590 from the magnetic materials is directed through the patterned thin IL and TR layer 525 into the patterned third gradient heat sink layer 650 with low thermal conductivity. The heat flow rate increases as heat is dissipated from the patterned third gradient heat sink layer 650 to the patterned second gradient heat sink layer 515 with a greater thermal conductivity k value. The heat flow rate quickens further as heat is dissipated from the patterned second gradient heat sink layer 515 to the partially patterned first continuous heat sink layer 660 with high thermal conductivity and a differing mass of one embodiment.

Patterning the thin IL and TR layer 520 of FIG. 5A and the gradient heat sink layers coupled with the partially patterned first continuous heat sink layer 660 enables avoiding lateral thermal bloom. Avoiding lateral thermal bloom prevents unintended damage to recorded data in adjacent non-targeted patterned BPM feature pillar (dot) 580 features. The reduction in mass of the patterned thin IL and TR layer 525 shortens the heating time of the magnetic materials thus reducing the power input to the laser power heating source 560. The avoidance of lateral thermal bloom and rapid heat dissipation using the directed heat dissipation creates a stabilized thermal gradient across the HAMR stack by avoiding hot spots caused by lateral thermal bloom. A stabilized thermal gradient enables stable analog to digital conversion of the recorded data in a read function. The stabilized thermal gradient in turn stabilizes the magnetic field gradient and prevents data recording errors using the method for fabricating patterned gradient heat sinks of one embodiment.

The foregoing has described the principles, embodiments and modes of operation. However, these should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. An apparatus comprising:
a substrate;
a multilayered heat sink layer over the substrate,
wherein layers of the multilayered heat sink layer are arranged to form a thermal conductivity gradient;
a thermal resistor layer over the multilayered heat sink layer; and
a magnetic layer over the thermal resistor layer,
wherein features are patterned into the apparatus from the magnetic layer through a portion of the multilayered heat sink layer substantially eliminating a physical path for lateral thermal bloom between the features.

2. The apparatus of claim 1,
wherein the thermal conductivity gradient directs heat flow toward the substrate.

3. The apparatus of claim 1,
wherein the layers of the multilayered heat sink layer are arranged in order of increasing thermal conductivity toward the substrate.

4. The apparatus of claim 1,
wherein the multilayered heat sink layer comprises at least a second heat sink layer possessing a second thermal conductivity over a first heat sink layer possessing a first thermal conductivity, and
wherein the first thermal conductivity is greater than the second thermal conductivity.

5. The apparatus of claim 4,
wherein the portion of the multilayered heat sink layer through which the features are patterned consists of the layers of the multilayered heat sink layer over the first heat sink layer.

6. The apparatus of claim 1,
wherein the multilayered heat sink layer comprises at least a third heat sink layer possessing a third thermal conductivity over a second heat sink layer possessing a second thermal conductivity over a first heat sink layer possessing a first thermal conductivity,
wherein the first thermal conductivity is greater than the second thermal conductivity, and
wherein the second thermal conductivity is greater than the third thermal conductivity.

7. The apparatus of claim 6,
wherein the portion of the multilayered heat sink layer through which the features are patterned consists of the layers of the multilayered heat sink layer over the first heat sink layer and a portion of the first heat sink layer.

8. The apparatus of claim 7,
wherein the portion of the first heat sink layer extends 1 to 20 nm into the first heat sink layer.

9. The apparatus of claim 6,
wherein the magnetic layer is a dual-layered magnetic layer.

10. The apparatus of claim 1,
wherein the features correspond to features of 2-5 $TB/in^2$ bit-patterned media for heat-assisted magnetic recording.

11. An apparatus comprising:
a multilayered heat sink layer over a substrate,
wherein the multilayered heat sink layer comprises at least a second heat sink layer possessing a second thermal conductivity over a first heat sink layer possessing a first thermal conductivity, and
wherein the first thermal conductivity is greater than the second thermal conductivity;
a thermal resistor layer over the heat sink layer; and
a magnetic layer over the thermal resistor layer,
wherein features are patterned into the apparatus from the magnetic layer through a portion of the multilayered heat sink layer.

12. The apparatus of claim 11,
wherein the portion of the multilayered heat sink layer through which the features are patterned consists of the layers of the multilayered heat sink layer over the first heat sink layer.

13. The apparatus of claim 11,
wherein the portion of the multilayered heat sink layer through which the features are patterned consists of the layers of the multilayered heat sink layer over the first heat sink layer and a portion of the first heat sink layer.

14. The apparatus of claim 13,
wherein the portion of the first heat sink layer extends 1 to 20 nm into the first heat sink layer.

15. The apparatus of claim 11,
wherein the features correspond to features of bit-patterned media for heat-assisted magnetic recording.

16. An apparatus comprising:
a multilayered heat sink layer over a substrate,
- wherein the multilayered heat sink layer comprises at least a third heat sink layer possessing a third thermal conductivity over a second heat sink layer possessing a second thermal conductivity over a first heat sink layer possessing a first thermal conductivity,
- wherein the first thermal conductivity is greater than the second thermal conductivity, and
- wherein the second thermal conductivity is greater than the third thermal conductivity;

a thermal resistor layer over the heat sink layer; and a magnetic layer over the thermal resistor layer,
- wherein features are patterned into the apparatus from the magnetic layer through a portion of the multilayered heat sink layer.

17. The apparatus of claim 16,
wherein the portion of the multilayered heat sink layer through which the features are patterned consists of the layers of the multilayered heat sink layer over the first heat sink layer.

18. The apparatus of claim 16,
wherein the portion of the multilayered heat sink layer through which the features are patterned consists of the layers of the multilayered heat sink layer over the first heat sink layer and a portion of the first heat sink layer.

19. The apparatus of claim 18,
wherein the portion of the first heat sink layer extends 1 to 20 nm into the first heat sink layer.

20. The apparatus of claim 16,
wherein the features correspond to features of bit-patterned media for heat-assisted magnetic recording.

\* \* \* \* \*